(12) United States Patent
Dillenberger et al.

(10) Patent No.: US 8,294,705 B2
(45) Date of Patent: Oct. 23, 2012

(54) VIRTUAL NETWORK OPERATIONS CENTER

(75) Inventors: Donna N. Dillenberger, Yorktown Heights, NY (US); Michael J. Osias, Westtown, NY (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 11/747,157

(22) Filed: May 10, 2007

(65) Prior Publication Data
US 2008/0278478 A1 Nov. 13, 2008

(51) Int. Cl.
*G06T 15/00* (2011.01)
(52) U.S. Cl. .................................... 345/419
(58) Field of Classification Search .............. None
See application file for complete search history.

(56) References Cited

U.S. PATENT DOCUMENTS

| | | | |
|---|---|---|---|
| 5,353,399 A | 10/1994 | Kuwamoto et al. | |
| 5,781,229 A | 7/1998 | Zediker et al. | |
| 5,884,029 A | 3/1999 | Brush, II et al. | |
| 5,958,012 A * | 9/1999 | Battat et al. | 709/224 |
| 5,999,208 A * | 12/1999 | McNerney et al. | 348/14.08 |
| 6,054,987 A | 4/2000 | Richardson | |
| 6,112,015 A | 8/2000 | Planas et al. | |
| 6,195,184 B1 | 2/2001 | Chao et al. | |
| 6,271,845 B1 | 8/2001 | Richardson | |
| 6,289,380 B1 * | 9/2001 | Battat et al. | 709/224 |
| 6,404,437 B1 | 6/2002 | Russell, II et al. | |
| 6,456,306 B1 | 9/2002 | Chin et al. | |
| 6,633,312 B1 | 10/2003 | Rochford et al. | |
| 6,809,738 B2 | 10/2004 | Hubrecht et al. | |
| 6,970,919 B1 * | 11/2005 | Doi et al. | 709/220 |
| 7,012,602 B2 | 3/2006 | Watson et al. | |
| 7,055,107 B1 | 5/2006 | Rappaport et al. | |
| 7,073,129 B1 | 7/2006 | Robarts et al. | |
| 7,197,193 B2 | 3/2007 | Li et al. | |
| 7,319,992 B2 | 1/2008 | Gaos | |
| 7,336,383 B2 * | 2/2008 | Kageyama | 358/1.15 |
| 7,386,628 B1 | 6/2008 | Hansell et al. | |
| 7,487,228 B1 | 2/2009 | Preslan et al. | |
| 7,502,854 B2 | 3/2009 | Luo et al. | |

(Continued)

FOREIGN PATENT DOCUMENTS

WO 0150387 A1 7/2001

OTHER PUBLICATIONS

Lihui Wang, Ryan Sams, Marcel Verner, Fengfeng Xi, "Integrating Java 3D model and sensor data for remote monitoring and control", Robotics and Computer-Integrated Manufacturing, vol. 19, Issues 1-2, Feb.-Apr. 2003, pp. 13-19, ISSN 0736-5845.*

(Continued)

*Primary Examiner* — Daniel Hajnik
(74) *Attorney, Agent, or Firm* — William E. Schiesser; Hoffman Warnick LLC

(57) ABSTRACT

A system, method, program product and service for implementing a virtual network operations center. A system is disclosed that includes: a system for rendering three dimensional (3D) models in an observation space, in which the 3D models mirror actual components in an associated operations center. Also included is a system for rendering a virtual display in the observation space, wherein the virtual display provides a message board for operators viewing the observation space, a cueing system for generating cues within the 3D models; and a communications hub for providing bidirectional communications with the associated operations center.

20 Claims, 6 Drawing Sheets

U.S. PATENT DOCUMENTS

| | | | |
|---|---|---|---|
| 7,657,545 | B2 | 2/2010 | Bird |
| 7,681,131 | B1 | 3/2010 | Quarterman et al. |
| 2001/0019328 | A1 | 9/2001 | Schwuttke et al. |
| 2001/0051913 | A1 | 12/2001 | Vashistha et al. |
| 2002/0013837 | A1* | 1/2002 | Battat et al. ............... 709/223 |
| 2002/0113820 | A1* | 8/2002 | Robinson et al. ............ 345/764 |
| 2002/0134985 | A1 | 9/2002 | Chen et al. |
| 2002/0135610 | A1 | 9/2002 | Ootani et al. |
| 2003/0028269 | A1 | 2/2003 | Spriggs et al. |
| 2003/0033402 | A1 | 2/2003 | Battat et al. |
| 2003/0212775 | A1 | 11/2003 | Steele et al. |
| 2004/0120021 | A1 | 6/2004 | Kihara et al. |
| 2005/0039132 | A1 | 2/2005 | Germain et al. |
| 2005/0052714 | A1 | 3/2005 | Klug et al. |
| 2005/0162721 | A1 | 7/2005 | Kihara et al. |
| 2005/0183041 | A1 | 8/2005 | Chiu et al. |
| 2006/0090136 | A1 | 4/2006 | Miller et al. |
| 2006/0171538 | A1 | 8/2006 | Larson et al. |
| 2006/0248159 | A1 | 11/2006 | Polan |
| 2006/0271563 | A1 | 11/2006 | Angelo et al. |
| 2006/0277080 | A1 | 12/2006 | DeMartine et al. |
| 2007/0027973 | A1 | 2/2007 | Stein et al. |
| 2007/0067435 | A1 | 3/2007 | Landis et al. |
| 2007/0136788 | A1 | 6/2007 | Monahan et al. |
| 2007/0174777 | A1 | 7/2007 | Finley et al. |
| 2007/0198695 | A1* | 8/2007 | Engelmann et al. .......... 709/224 |
| 2007/0213956 | A1 | 9/2007 | Nasle et al. |
| 2007/0219645 | A1* | 9/2007 | Thomas et al. ................ 700/29 |
| 2007/0233839 | A1 | 10/2007 | Gaos |
| 2008/0043760 | A1 | 2/2008 | Venkatraman et al. |
| 2008/0049013 | A1* | 2/2008 | Nasle ............................ 345/419 |
| 2008/0062167 | A1* | 3/2008 | Boggs et al. ................. 345/419 |
| 2008/0126110 | A1 | 5/2008 | Haeberle et al. |
| 2008/0281912 | A1 | 11/2008 | Dillenberger et al. |
| 2008/0282242 | A1 | 11/2008 | Dillenberger et al. |
| 2010/0083148 | A1 | 4/2010 | Finn et al. |

OTHER PUBLICATIONS

Raskar et al., "The Office of the Future: A Unified Approach to Image-Based Modeling and Spatially Immersive Displays," Jul. 1998, pp. 1-10, Computer Graphics Proceedings, Annual Conference Series, SIGGRAPH 98, Orlando.

Guleyupoglu et al., "Distributed Collaborative Virtual Reality Framework for System Prototyping and Training," Oct. 2000, pp. 29-1-29-8, RTO IST Symposium, Published in RTO MP-049.

Dillenberger et al., U.S. Appl. No. 11/747,147, filed May 10, 2007, Office Communication dated Nov. 19, 2009, 20 pages.

Dillenberger et al., U.S. Appl. No. 11/747,147, filed May 10, 2007, Office Communication dated Apr. 7, 2010, 22 pages.

Dillenberger et al., U.S. Appl. No. 11/747,182, filed May 17, 2007, Office Communication dated Dec. 3, 2009, 15 pages.

Dillenberger et al., U.S. Appl. No. 11/747,182, filed May 17, 2007, Notice of Allowance and Fee(s) Due dated Apr. 21, 2010, 17 pages.

Dillenberger et al., U.S. Appl. No. 11/750,216, filed May 17, 2007, Office Communication dated Apr. 5, 2010, 10 pages.

Hajnik, U.S. Appl. No. 11/747,182, Notice of Allowance & Fees Due, Jul. 16, 2010, 24 pages.

Hajnik, U.S. Appl. No. 11/750,141, Office Action Communication, Sep. 7, 2010, 25 pages.

Hajnik, U.S. Appl. No. 11/747,147, Office Action Communication, Sep. 21, 2010, 25 pages.

Hajnik, Office Action Communication for U.S. Appl. No. 11/750,1741 dated Jan. 13, 2011, 23 pages.

Wong, U.S. Appl. No. 11/750,216, Office Action Communication, Oct. 1, 2010, 22 pages.

Hajnik, U.S. Appl. No. 11/750,141, Notice of Allowance & Fees Due, Sep. 23, 2011, 12 Pages.

Wong, U.S. Appl. No. 11/750,216, Office Action Communication, Dec. 21, 2011, 19 pages.

Hajnik, U.S. Appl. No. 11/747,147, Office Action Communication, Dec. 30, 2011, 28 pages.

Daniel F. Hajnik, PTO Office Action, U.S. Appl. No. 11/750,141, Notification Date Apr. 25, 2011, 19 pages.

Daniel F. Hajnik, PTO Final Office Action, U.S. Appl. No. 11/747,147, Notification Date Feb. 22, 2011, 18 pages.

William Wong, PTO Office Action, U.S. Appl. No. 11/750,216, Notification Date Jul. 6, 2011, 17 pages.

Hajnik, U.S. Appl. No. 11/747,147, Office Action Communication, May 1, 2012, 29 pages.

Hajnik, U.S. Appl. No. 11/750,141, Notice of Allowance & Fees Due, 9 pages, 2012.

* cited by examiner

VIRTUAL NETWORK OPERATIONS CENTER

FIELD OF THE INVENTION

The invention relates generally to managing an operations center, and more particularly to a system and method of generating a holographic three dimensional view of an operations center that provides a real time operational mirror of an actual data center.

BACKGROUND OF THE INVENTION

As greater and greater demands are placed on operations centers, such as those utilized by information technology providers, utility providers, military and intelligence, service centers, etc., the greater the management challenges become. For instance, a data center, which is used to house mission critical computer systems and associated components (e.g., server hardware, environmental controls, redundant/backup power supplies, redundant data communications connections, high security systems, etc.), may be housed in large buildings covering tens of thousands of square feet. Managing all of the operations of such a facility can be both difficult and costly.

One approach to managing such a facility is to utilize some type of virtual representation of the operations center, which can provide operational information and allow the operator to respond or act accordingly. However, such approaches lack the ability to provide robust representations to allow a user to navigate all of the systems in such an environment. Accordingly, a need exists for a virtual network operations center that addresses the above-mentioned issues.

SUMMARY OF THE INVENTION

The present invention addresses the above-mentioned problems, as well as others, by providing a virtual network operations center to provide an enhanced method of human interaction with systems and processes in an operations center.

In a first aspect, the invention provides a system for implementing a virtual network operations center, comprising: a system for rendering three dimensional (3D) models in an observation space, wherein the 3D models mirror actual components in an associated operations center; a system for rendering a virtual display in the observation space, wherein the virtual display provides a message board for operators viewing the observation space; a cueing system for generating cues within the 3D models; and a communications hub for providing bidirectional communications with the associated operations center.

In a second aspect, the invention provides a method for implementing a virtual network operations center, comprising: rendering three dimensional (3D) models in an observation space, wherein the 3D models mirror actual components in an associated operations center; rendering a virtual display in the observation space, wherein the virtual display provides a message board for operators viewing the observation space; and providing bidirectional communications with the associated operations center.

In a third aspect, the invention provides a method for implementing a virtual network operations center, comprising: rendering three dimensional (3D) models in an observation space, wherein the 3D models mirror actual components in an associated operations center; rendering a virtual display in the observation space, wherein the virtual display provides a message board for operators viewing the observation space; and providing bidirectional communications with the associated operations center.

In a fourth aspect, the invention provides a method for deploying a system for implementing a virtual network operations center, comprising: providing a computer infrastructure being operable to: render three dimensional (3D) models in an observation space, wherein the 3D models mirror actual components in an associated operations center; render a virtual display in the observation space, wherein the virtual display provides a message board for operators viewing the observation space; and provide bidirectional communications with the associated operations center.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
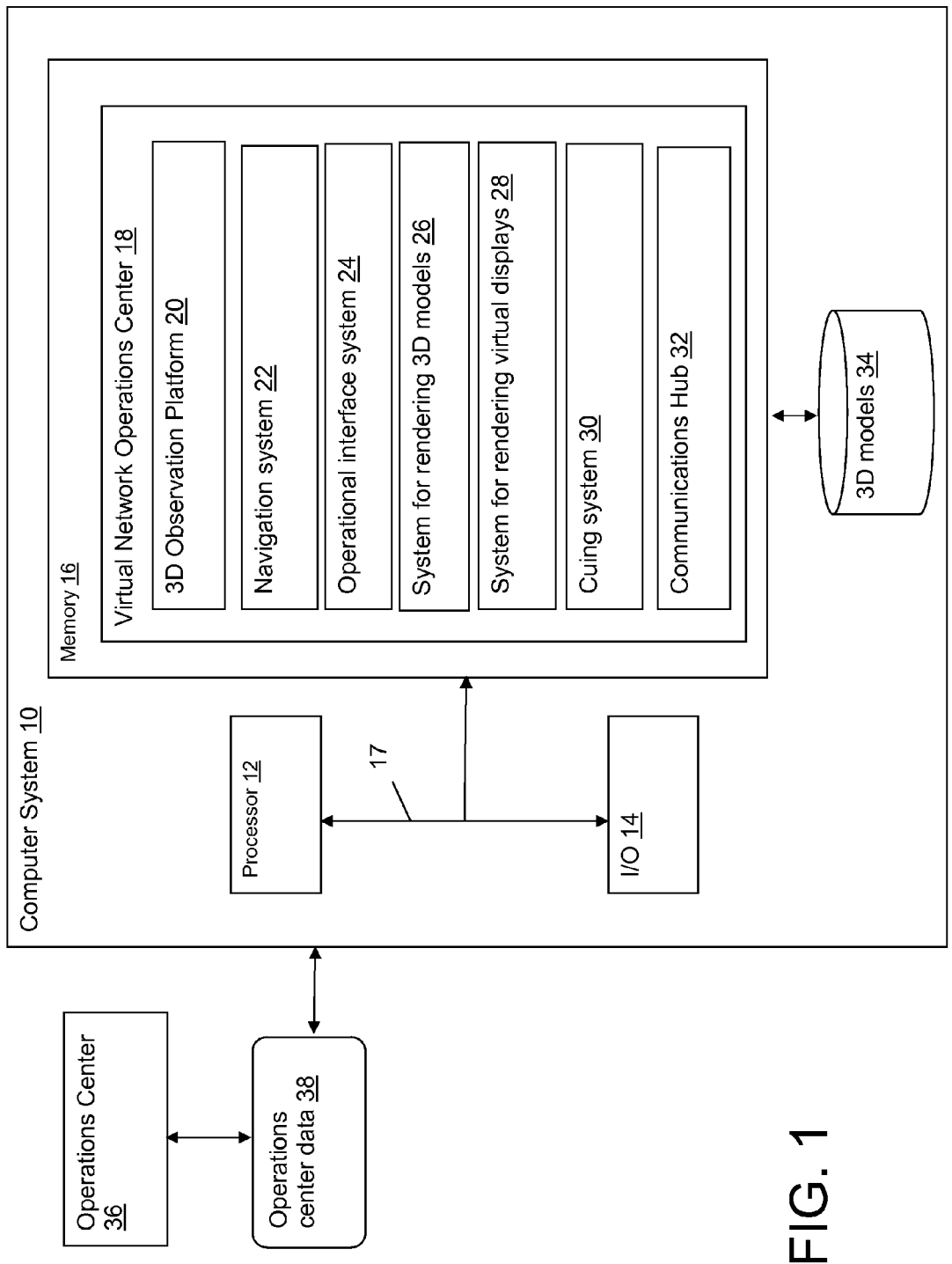
FIG. 1 depicts a computer system having a virtual network operations center in accordance with an embodiment of the present invention.

Referring now to drawings, FIG. 1 depicts a computer system 10 having a virtual network operations center (VNOC) 18 that provides an enhanced method of human interaction with systems and processes occurring in an operations center 36. VNOC 18 is generated in a simulated three dimensional (3D) observation space, such as a 256×256×768 3D vector space. The observation space provides a virtual universe, in which one or more operators can engage and interact (e.g., as avatars) with VNOC 18 to view and manipulate virtual components that are mirrored from the actual operations center 36.

VNOC 18 includes a system for generating an observation platform 20 from which the VNOC 18 can be viewed, a navigation system 22 for navigating about the VNOC 18, an operational interface system 24 for interfacing with the VNOC 18 to effectuate actual changes in the operations center, a system for rendering three dimensional models 26 (also referred to herein as rezzers) from 3D models database 34, a system for rendering virtual displays 28, a cuing system 30, a communications hub 32, and a virtual enterprise (i.e., holographic) service bus 17. These components work together to generate and maintain a mirror image of operations center 36, and to provide spatial, visual, and audio cues that alert and inform operators. Operations centers 36 may comprise any type of enterprise management environment, e.g., a data center, a utility service providers, military command and control systems, etc.

In the illustrative examples described herein, VNOC 18 is generated as a holographic observation space, which is automatically rendered and its state maintained with operations center data 38 from a real operations center 36. As noted, VNOC 18 mirrors both the spatial and operational configuration of the real operations center 36. Thus, an operator may navigate VNOC 18 as if they were inside the real operations center 36. In an illustrative embodiment, the actual place, size, and shape of components in the operations center are maintained in the VNOC 18.

3D models 34 may include a representation of any component found in the real operations center 36, including systems, processes, devices, programs, equipment, servers, HVAC, floor plans, etc. Moreover, the system for rendering 3D models 36 (i.e., rezzers) can be configured to display expanded or layered views of the internals of any component. For example, clicking on a server may show visual cues of the CPU, hard disk, and logical partitions. Further clicking on any of these components shows or expands the next level of detail. Middleware architecture can also be rendered in 3D in the VNOC 18 to show a 3D representation of operating systems, application servers, databases, web services, transaction flows, and ultimately virtual business processes. The hardware and software renderings may be layered in 3D on a rendered platform (e.g., surface or floor), and appears as a virtual "stack" with the systems on the bottom, and business processes on the top.

Cueing system 30 provides a mechanism for cuing an operator of some relevant information associated with a modeled component. In particular, cuing system 30 may present a variety of visual and audio cues to alert operators of conditions in the operations center 36. These cues can for instance comprise alerts that change a color of a component, highlight a component with a 3D arrow, sound an alert message, set off various beacons, etc. Cues may occur in response to hardware faults, middleware or operating system configuration issues, business process performance issues, etc.

Communications hub 32 manages communications between VNOC 18 and operations center 36. In this illustrative embodiment, operations center data 38 is encapsulated in packets using XML-RPC (remote procedure calls) encoded with the Holographic Protocol Architecture (HPA). HPA is a predefined protocol utilized by a scalable interface, e.g., implemented as a '2D' java server that processes operations information associated with operations center 36, which is ultimately rendered in 3D by VNOC 18. Communications hub 32 also manages other communications between VNOC 18 and operations center 36, such as email.

Communications hub 32 receives messages (i.e., operations center data 38), and decodes the packets via a protocol driver. These packets are then used by the VNOC 18 for rendering 3D models 26, by virtual displays, and by cues within the VNOC 18. The communications hub 32 also manages outgoing communications, and has a packet driver and queuing system to dispatch packets over responding XML-RPC connections.

Communications with the VNOC 18 is based on inter-object messages using communications channels and email. For example, the rezzers receive communications about which types of equipment, middleware, and process objects to model, and the virtual displays receive information of interest about the operations being managed. Operators are able to perform all management functions by interacting with 3D models, such as provisioning an LPAR, a cluster, or an entire grid, as well as install and configure operating systems and middleware.

Figure 2:
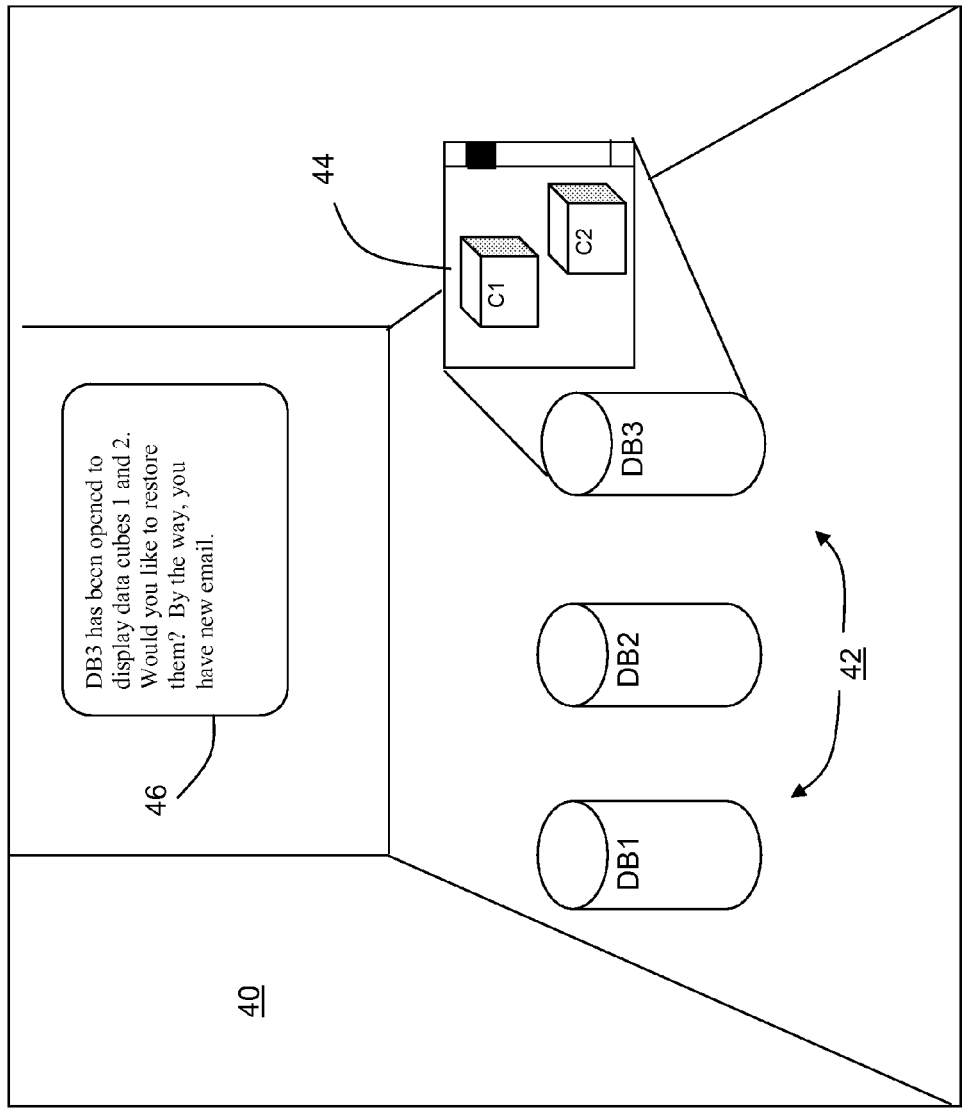
FIG. 2 depicts a virtual network observation center in accordance with an embodiment of the present invention.

FIG. 2 depicts a simple example of a VNOC 40 that includes three database models 42, DB1, DB2 and DB3, and a virtual display 46. In this case, the operator has navigated to DB3 and launched an exploded view 44 of the data in the database. In this case, two data cubes, C1 and C2 are shown, which could be further exploded or manipulated if desired. For instance, operational interface system 24 (FIG. 1) allows the operator to perform operations on any objects in the VNOC 40. Any type of operation could be performed that could otherwise be applied to the actual components in the real operations center 36, e.g., configurations, deletions, viewing, partitioning, rebooting, etc.

As noted, VNOC 40 also includes a virtual display 46. Virtual display 46 may include any type of information that might be relevant to the operator or operations of the VNOC 40. For instance, it might include operational information, help information, notifications from other operators viewing the VNOC 40, etc. In this case, virtual display 46 is letting the operator know what action they have take, possible courses of action, and a message that the operator has new email.

Figure 3:
FIG. 3 depicts an observation platform in accordance with an embodiment of the present invention.
Figure 4:
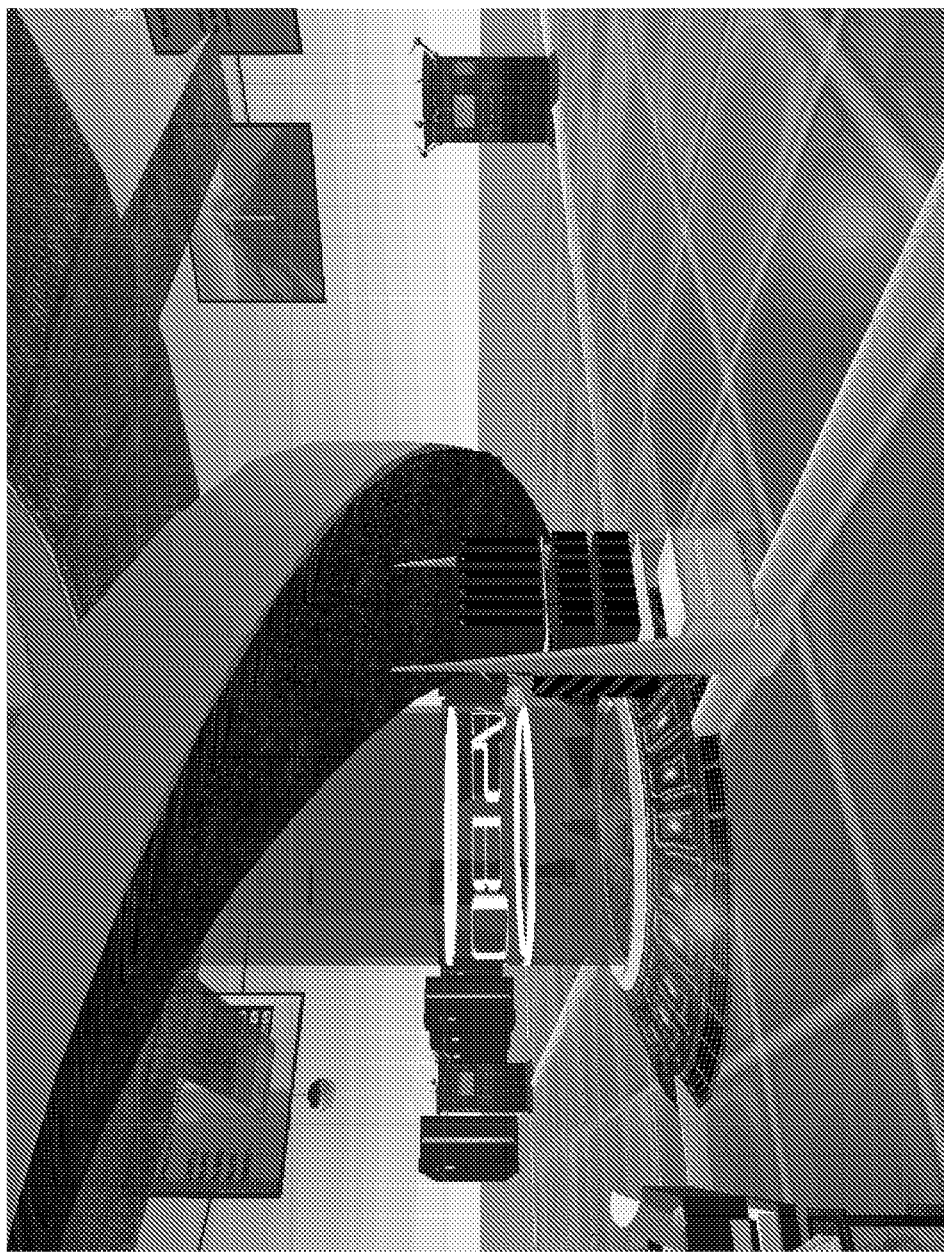
FIG. 4 depicts a view of a communication hub in a virtual network observation center in accordance with an embodiment of the present invention.
Figure 5:
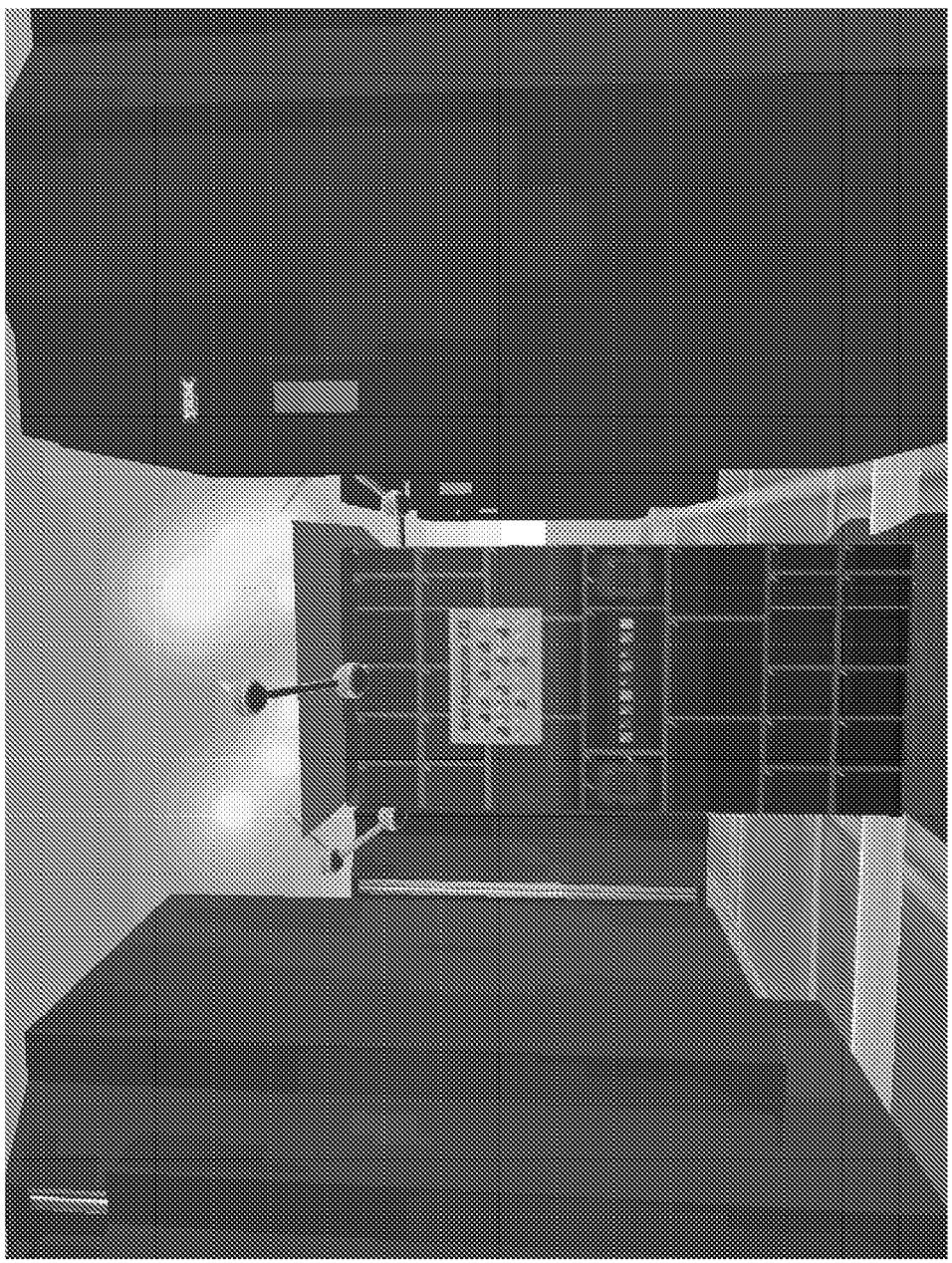
FIG. 5 depicts a rezzer for generating server models in accordance with an embodiment of the present invention.
Figure 6:
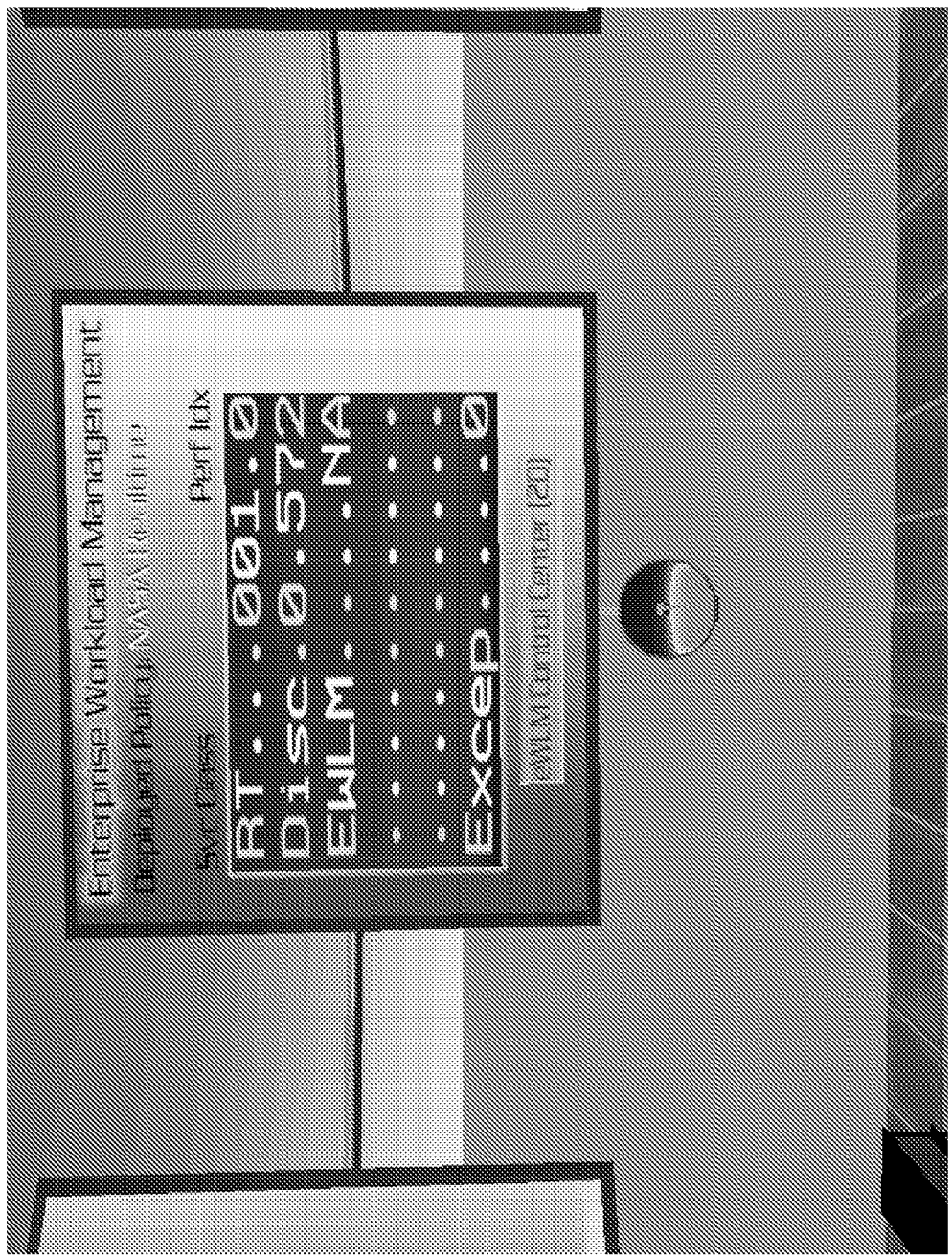
FIG. 6 depicts a virtual display in accordance with an embodiment of the present invention.

FIG. 3 depicts an aerial 3D view of a VNOC, showing the virtual displays, an observation platform, and server models. FIG. 4 depicts a 3D view of a communications hub with a VNOC. Scripts run inside the server banks and the ring in the center to manage communications between the VNOC and the associated real operations center and within the VNOC over the holographic network. FIG. 5 depicts a rezzer that generates server models and configurations based on information received from the holographic bus. FIG. 6 depicts an example of a VNOC display, showing eWLM performance data. The satellite dish on the bottom is the display driver and receives messages from the communication hub via the holographic bus.

Referring again to FIG. 1, computer system 10 may be implemented using any type of computing device, and may be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network 36 such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising VNOC 18 could be created, maintained and/or deployed by a service provider that offers the functions described herein for customers. That is, a service provider could offer to provide a virtual network operating system as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computer system comprising:
at least one computing device including:
a system for implementing a virtual network operations center by performing a method comprising:
rendering an observation space representing the virtual network operations center, wherein the rendering includes rendering three dimensional (3D) models in the observation space, wherein the 3D models mirror actual components in an associated operations center;
enabling manipulation of the 3D models by an operator;
generating a set of messages for processing by the associated operations center in response to the manipulation, wherein the set of messages directly effectuates changes in the operations center without further user action at the associated operations center;
rendering a virtual display in the observation space, wherein the virtual display is a component of the virtual network operations center, does not have an associated component in the associated operations center and provides a changeable message board for operators viewing the observation space, and wherein the message board displays unique content for each operator, the unique content includes at least one of a message or a notification relating to at least one of operations or events of the virtual network operations center; and
automatically generating audio and visual cues to alert an operator interacting with the 3D models, wherein the cues are generated in response to hardware faults and middleware or operating system configuration issues, and wherein the visual cues are rendered within the 3D models.

2. The system of claim 1, further comprising selecting the 3D models for rendering from a database of 3D models.

3. The system of claim 1, the method further comprising enabling an operator to move about within the observation space.

4. The system of claim 3, wherein the enabling includes enabling the operator to select a 3D model to view layered details of the 3D model.

5. The system of claim 1, wherein the rendering 3D models maintains substantially similar spatial characteristics as actual components in the associated operations center.

6. The system of claim 1, the method further comprising generating an observation platform within the observation space.

7. A computer program product comprising non-transitory computer readable medium, which when executed, implements a virtual network operations center by performing a method comprising:
rendering an observation space representing the virtual network operations center, wherein the rendering includes rendering three dimensional (3D) models in the observation space, wherein the 3D models mirror actual components in an associated operations center;
enabling manipulation of the 3D models by an operator;
generating a set of messages for processing by the associated operations center in response to the manipulation, wherein the set of messages directly effectuates changes in the operations center without further user action at the associated operations center;
rendering a virtual display in the observation space, wherein the virtual display is a component of the virtual network operations center, does not have an associated component in the associated operations center and provides a changeable message board for operators viewing the observation space, and wherein the message board displays unique content for each operator, the unique content includes at least one of a message or a notification relating to at least one of operations or events of the virtual network operations center; and
automatically generating audio and visual cues to alert an operator interacting with the 3D models, wherein the cues are generated in response to hardware faults and middleware or operating system configuration issues, and wherein the visual cues are rendered within the 3D models.

8. The program product of claim 7, the method further comprising selecting the 3D models for rendering from a database of 3D models.

9. The program product of claim 7, the method further comprising enabling an operator to navigate the observation space.

10. The program product of claim 7, the method further comprising enabling an operator to select a 3D model to view layered details of the 3D model.

11. The program product of claim 7, the method further comprising generating an observation platform within the observation space.

12. A method for implementing a virtual network operations center, comprising:

rendering an observation space representing the virtual network operations center using a computer, wherein the rendering includes rendering three dimensional (3D) models in the observation space, wherein the 3D models mirror actual components in an associated operations center;

enabling manipulation of the 3D models by an operator;

generating a set of messages for processing by the associated operations center in response to the manipulation, wherein the set of messages directly effectuates changes in the operations center without further user action at the associated operations center;

rendering a virtual display in the observation space using the computer, wherein the virtual display is a component of the virtual network operations center, does not have an associated component in the associated operations center and provides a changeable message board for operators viewing the observation space, and wherein the message board displays unique content for each operator, the unique content includes at least one of a message or a notification relating to at least one of operations or events of the virtual network operations center; and automatically generating audio and visual cues to alert an operator interacting with the 3D models using the computer, wherein the cues are generated in response to hardware faults and middleware or operating system configuration issues, and wherein the visual cues are rendered within the 3D models.

13. The method of claim 12, further comprising retrieving the 3D models for rendering from a database of 3D models.

14. The method of claim 12, further comprising enabling an operator to navigate the observation space.

15. The method of claim 12, further comprising enabling an operator to select a 3D model to view layered details of the 3D model.

16. A method for deploying a system for implementing a virtual network operations center, comprising:

configuring a computer infrastructure to:

render an observation space representing the virtual network operations center, wherein the rendering includes render three dimensional (3D) models in the observation space, wherein the 3D models mirror actual components in an associated operations center;

enable manipulation of the 3D models by an operator;

generate a set of messages for processing by the associated operations center in response to the manipulation, wherein the set of messages directly effectuates changes in the operations center without further user action at the associated operations center;

render a virtual display in the observation space, wherein the virtual display is a component of the virtual network operations center, does not have an associated component in the associated operations center and provides a changeable message board for operators viewing the observation space, and wherein the message board displays unique content for each operator, the unique content includes at least one of a message or a notification relating to at least one of operations or events of the virtual network operations center; and automatically generate audio and visual cues to alert an operator interacting with the 3D models, wherein the cues are generated in response to hardware faults and middleware or operating system configuration issues, and wherein the visual cues are rendered within the 3D models.

17. The method of claim 12, wherein the set of messages includes a set of messages for provisioning a set of components of the associated operations center.

18. The method of claim 12, wherein the set of messages includes a set of messages for at least one of: installing or configuring at least one of: an operating system or middleware in the associated operations center.

19. The method of claim 12, wherein the unique content for an operator includes a message from another operator viewing the virtual network operations center.

20. The method of claim 12, wherein the virtual network operations center includes at least one 3D model corresponding to a communications hub, wherein the communications hub manages communications between the virtual network operations center and the associated operations center.

* * * * *